Patented Apr. 25, 1939

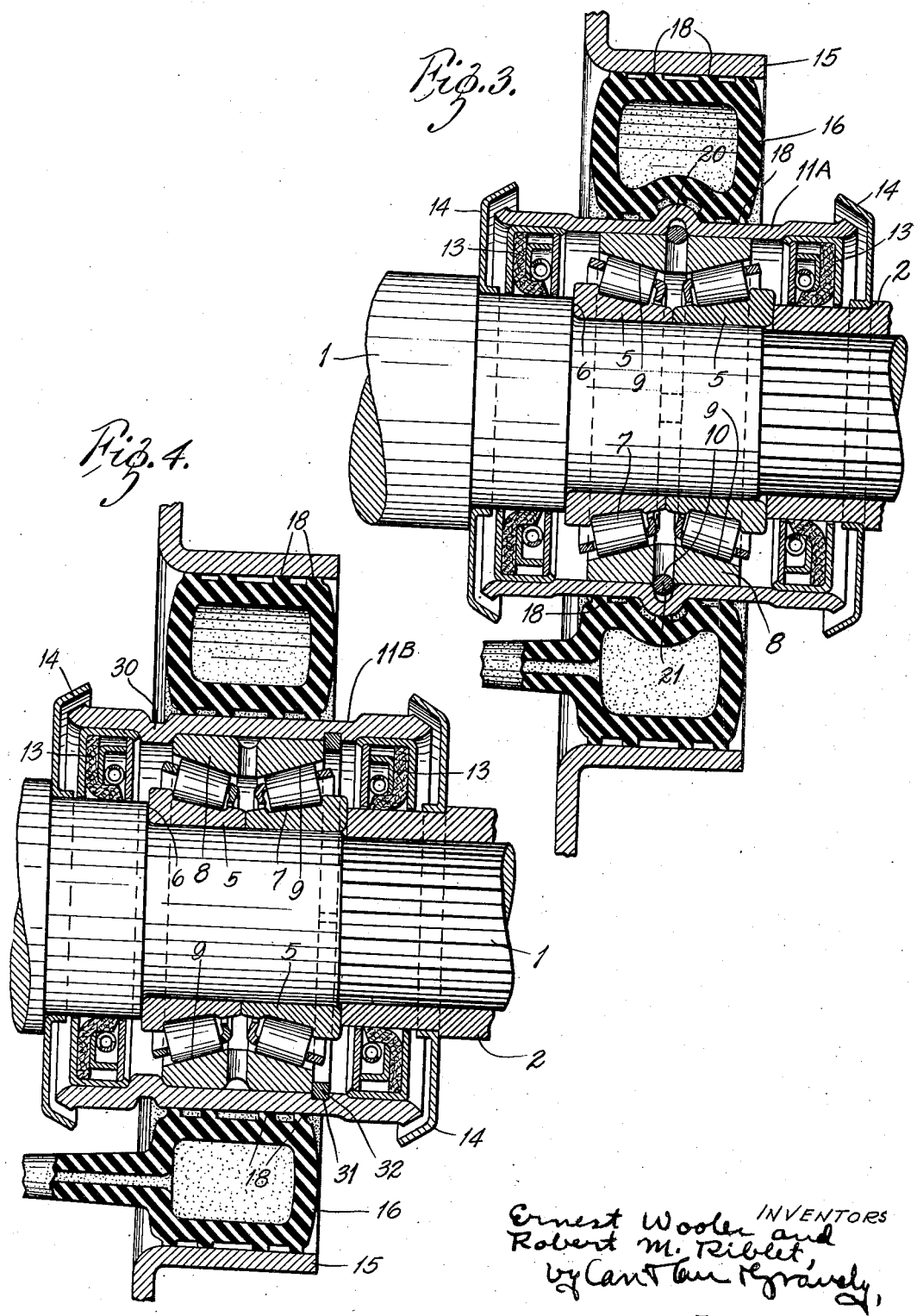

2,155,919

UNITED STATES PATENT OFFICE 2,155,919

SHAFT BEARING MOUNTING

Ernest Wooler and Robert M. Riblet, Canton, Ohio, assignors to The Timken Roller Bearing Company, Canton, Ohio, a corporation of Ohio Application August 4, 1937, Serial No. 157,247

2 Claims. (Cl. 308—184)

Our invention relates to the mounting of shaft bearings, particularly to the resilient mounting of propeller shaft bearings and the like. The invention has for its principal object a simple mounting which effectively accommodates angular displacement of the shaft. The invention consists in the shaft bearing mounting and in the parts and combinations and arrangements of parts hereinafter described and claimed.

Figure 1:
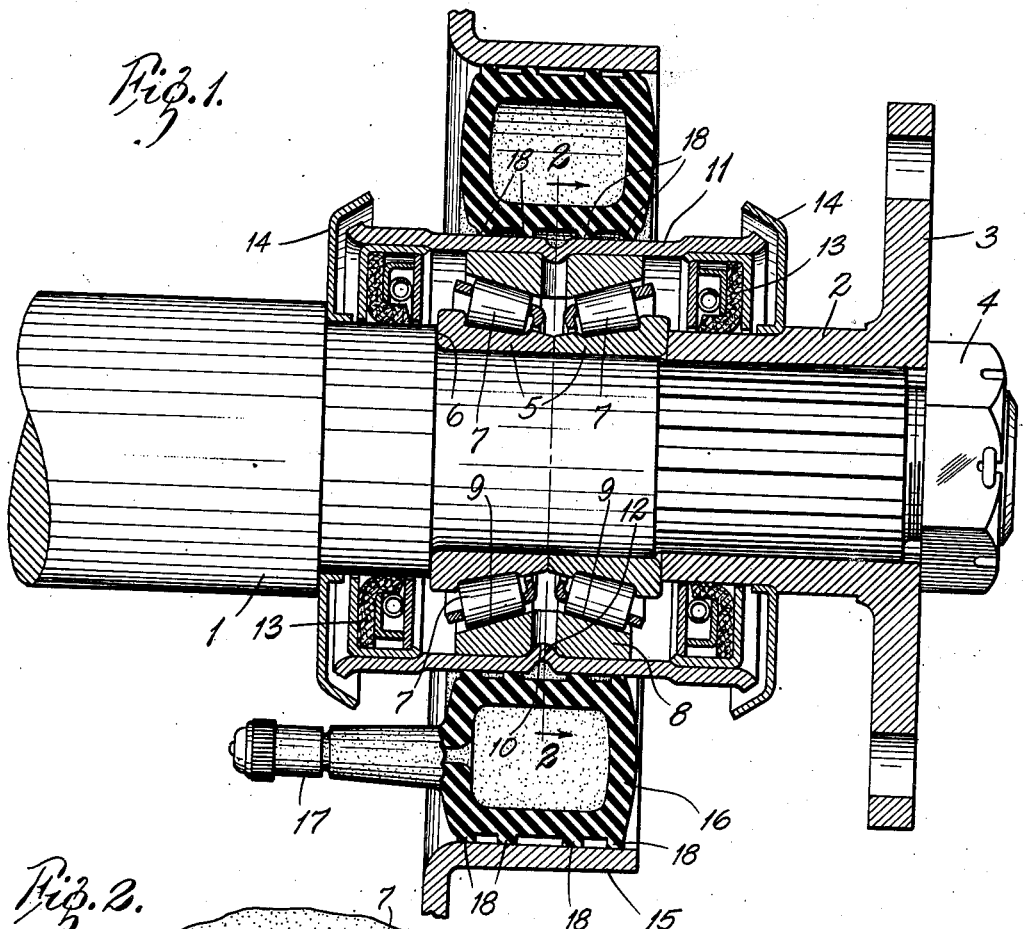
Figure 2:
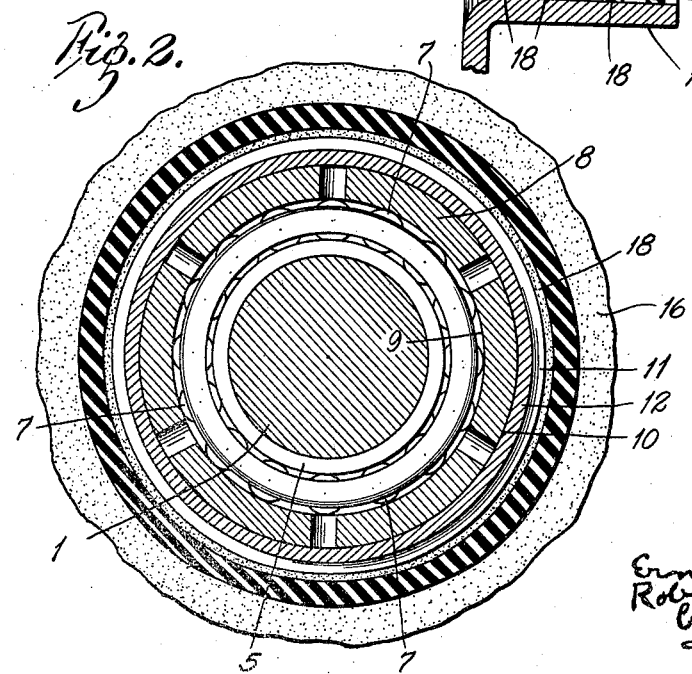

In the accompanying drawings, wherein like reference characters indicate like parts wherever they occur, Fig. 1 is a longitudinal sectional view of a shaft bearing mounting embodying our invention, Fig. 2 is a cross-sectional view on the line 2—2 of Fig. 1, Fig. 3 is a longitudinal sectional view of a modification, and Fig. 4 is a longitudinal sectional view of another modification.

In the drawings is illustrated an automobile propeller shaft 1, to the end of which is splined the extended hub portion 2 of a plate 3 for connection with a universal joint. A nut 4 holds said plate 3 on said shaft. Mounted on the shaft are two bearing cones 5, arranged with their small ends in engagement, one bearing cone being seated against a shoulder 6 on the shaft 1 and the other being engaged by said hub portion 2 of said plate 3. On each bearing cone 5 is mounted a series of tapered bearing rollers 7 and a one-piece cup 8 has two conical raceways 9, one for each set of rollers. Said double cup 8 is provided with an annular groove 10 extending around the middle of its outer periphery. The bearing cup is mounted in a hollow shell or cartridge 11 which has a rib 12 rolled into the peripheral groove 10 of said cup, thereby holding the shell 11 in place on said cup 8. In the end portions of said shell 11 are suitable sealing members 13 and flingers 14 may be mounted on said hub 2 and on the shaft, said flingers having portions overhanging the ends of the shell. The shell 11 extends through an annular support 15, which will be secured to or form part of a suitable member of the automobile frame (not shown in the drawings).

Interposed between the shell 11 and the support 15 is a resilient ring 16, the drawings illustrating a hollow rubber ring provided with a valve 17 by means of which it may be inflated after the assembly has been completed, thus providing a resilient support for the shaft, bearings and shell. Preferably said ring 16 has inner and outer peripheral ribs 18 engaging the shell 11 and the support 15, respectively.

In the modified construction shown in Fig. 3, the shell 11A has an outwardly projecting hollow annular rib or bead 20 and a split snap ring 21 resting in the inside of said bead and in the peripheral groove 10 of the cup 8 maintains the shell and cup in assembly. The projecting rib portion of said bead 20 indents the inflatable rubber member and thus maintains a very firm engagement therewith.

In the modified construction shown in Fig. 4, the shell 11B has an internal rib 30 near the end remote from the hub portion 2, constituting an abutment for one end of the bearing cup 8. Near the other end, said shell 11B has an internal annular groove 31 in which is a split ring 32 forming an abutment for the other end of said cup.

The above described invention forms an effective resilient mounting for the bearings of propeller shafts and the like. Obviously numerous changes may be made without departing from the invention and we do not wish to be limited to the precise construction shown.

What we claim is:

1. A resilient shaft bearing mounting comprising a shaft, a double row roller bearing therefor having an outer bearing cup, said cup having a central annular groove in its outer periphery, a housing enclosing said cup, said housing having a hollow circumferential rib overlying said groove in said cup, a ring disposed in said groove and the hollow of said rib to hold said cup in said housing and a resilient support for said housing extending over said hollow rib.

2. A resilient shaft bearing mounting comprising a shaft, a double row roller bearing therefor having an outer bearing cup, said cup having a central annular groove in its outer periphery, a housing encasing said bearing cup and projecting therebeyond at both ends, said housing having a hollow annular rib overlying said cup groove, a ring disposed in said cup groove and said hollow rib for holding said bearing cup in said housing, a resilient annular member surrounding said housing over said rib and an annular frame member in which said resilient member is mounted.

ERNEST WOOLER.
ROBERT M. RIBLET.